United States Patent [19]

Putney

[11] 4,275,803
[45] Jun. 30, 1981

[54] LOAD BRAKE

[75] Inventor: Gordon A. Putney, New Berlin, Wis.

[73] Assignee: Harnischfeger Corporation, West Milwaukee, Wis.

[21] Appl. No.: 80,414

[22] Filed: Oct. 1, 1979

[51] Int. Cl.³ .............................................. B60T 7/12
[52] U.S. Cl. .................................................. 188/134
[58] Field of Search ...................... 188/82.9, 83, 134; 192/8 R

[56] References Cited

U.S. PATENT DOCUMENTS 710,759  10/1902  Coleman et al. ................. 188/134 X Primary Examiner—Duane A. Reger
Attorney, Agent, or Firm—James E. Nilles

[57] ABSTRACT

A load brake for connection between a reversible hoist motor and a cable drum comprises a non-rotatable annular brake member having axially opposite friction surfaces, and coaxial annular first and second rotatable brake members at opposite sides of the non-rotatable brake member. The first rotatable brake member is constrained to rotate with the cable drum and is thus load-biased for rotation in a lowering direction. A rotation translating connection between the rotatable brake members, comprising elongated tension links having swivel connections to them and inclined to their axis, converges them towards clampwise engagement with the non-rotatable brake member in consequence of rotation of the first rotatable brake member in the lowering direction relative to the second rotatable brake member and permits divergence of the rotatable brake members upon their opposite relative rotation. A driver connected with the motor has a lost motion connection with each rotatable brake member whereby it applies substantial driving torque to the first rotatable brake member only in the load-raising direction while the second rotatable brake member maintains light frictional drag on the fixed brake member, and whereby it applies substantial driving torque to the second rotatable brake member only in the lowering direction while load torque tends to maintain the rotatable brake members frictionally engaged with the non-rotatable brake member.

14 Claims, 6 Drawing Figures

LOAD BRAKE

FIELD OF THE INVENTION

This invention relates to a load brake for a hoisting machine, whereby a load suspended by the machine is held against descent when a drive motor for the machine is at rest and is controlled in its descent when the motor is operating in its lowering direction; and the invention is more particularly concerned with a load brake which does not incorporate a pawl and ratchet arrangement or its equivalent, as has theretofore been usual in load brakes.

BACKGROUND OF THE PRIOR ART

For nearly a century the Weston-type load brake has been widely employed as a load control device for hoisting machines, to prevent descent of the load when the drive motor for the machine is delivering no torque to the cable drum and to control descent of the load when the motor is operating in the lowering direction. Through the years there have been many modifications and proposed modifications in the Weston load brake, as exemplified by U.S. Pat. No. 4,009,770, issued in 1977; but in essentials it has not changed, nor have all of its inherent disadvantages been overcome.

In general, a load brake of the Weston-type is characterized by a ratchet wheel that is permitted to rotate during raising of a load but is at all other times held against rotation by a pawl. In a simple form of Weston load brake, the load is coupled to a helically splined or threaded shaft that extends coaxially through the ratchet wheel and is freely rotatable relative to it. At one axial side of the ratchet wheel there is a flange-like friction element that is secured to the threaded shaft to rotate with it. At the other side of the ratchet wheel there is an axially movable friction element which has an internal thread engaged with the helical thread on the shaft and which is constrained to rotate with the drive motor.

When the drive motor is at rest so that the axially movable friction element is not being rotated, load torque imposed upon the threaded shaft tends to rotate that shaft in a direction such that the axially movable friction element is displaced axially along the shaft into engagement with the ratchet wheel, which is in turn forced axially into engagement with the flange-like friction element on the threaded shaft. Since the ratchet wheel is confined against load lowering rotation by the pawl, the clampwise engagement of the ratchet wheel by the friction elements prevents the threaded shaft from rotating in the load lowering direction in response to the torque that the load imposes upon it. If the motor now applies torque to the axially movable friction element in the load raising direction, any tendency towards relative rotation between that friction element and the load-biased threaded shaft will effect tighter clamping of the ratchet wheel by the friction elements; but since the ratchet wheel can turn freely in the load raising direction, friction due to such clamping merely results in more secure coupling of the axially movable friction element to the flange-like friction element so that the load is raised without slippage. When the hoisting motor is operated in the load lowering direction, the axially movable braking element is driven in the direction such that its rotation relative to the threaded shaft tends to carry it axially away from the clamping relationship. The ratchet wheel continues to be confined against rotation by the pawl, but to the extent that clamping force of the friction elements against the ratchet wheel is relieved, the flange-like element—and hence the threaded shaft—can rotate under load bias. However, the torque that the load imposes upon the threaded shaft still tends to drive it in the direction that actuates the axially movable friction element towards clamping engagement with the ratchet wheel, and therefore the load descends at a controlled rate that corresponds to the rotational speed of the drive motor, under a condition of equilibrium in which load torque plus motor torque are opposed by an equivalent drag force due to friction between the friction elements and the ratchet wheel.

The need for a pawl and ratchet arrangement in a conventional Weston load brake can be seen as a disadvantage because it requires the relatively expensive cutting of a ratchet gear. Heretofore, however, the necessity for such a mechanism was regarded as practically unavoidable, since the known alternatives (which included one-way clutches and various cam arrangements) tended to be more costly and/or less sturdy and reliable for use with very heavy loads.

A more fundamental objection to the Weston load brake was that it tended to impose limits upon the performance of hoisting apparatus driven by an electric motor having a given starting torque. As can be seen from the above description of the Weston device, the initial application of lifting torque to the axially movable friction element tended to drive it axially into firm engagement with the ratchet wheel. If the drive motor was capable of imparting a substantially high upward acceleration to a heavy load, the clamping engagement of the friction elements with the ratchet wheel could become so tight that the axially movable friction element acted upon the threaded shaft like a jam nut. When this happened, the motor did not have enough starting torque to break the jam and start the shaft rotating in the lowering direction.

Because of this tendency for the Weston load brake to lock up against load lowering, the motor that was selected for a given hoisting machine had to be one that had a higher starting torque than was actually needed for satisfactory load lifting acceleration, and the machine had to be restricted against use with loads that were actually within the load torque capabilities of its motor.

The helical power thread on the shaft of a Weston-type load brake was expensive to produce and was disproportionately more expensive with larger shaft sizes. The shaft was therefore kept as small as possible. To that end, the load brake was usually connected directly to the drive motor, and the conventional reduction gear train was connected between the load brake and the cable drum. The load brake was thus subjected to relatively small forces, but it operated at relatively high speed and was often so associated with the gear train that its rotating parts had to be lubricated. Since a load brake is dependent upon friction for its operation, severe design and maintenance problems were posed by the need for maintaining frictional relationships while at the same time providing for adequate lubrication. There was also some potential hazard in the interposition of the reduction gear train between the load brake and the cable drum because a failure in the gear train could result in the load being free to descend unrestrainedly.

Another potentially hazardous feature of the Weston-type load brake was that the helical power threads on its shaft were in certain cases subject to fatigue failure; and if they failed, there was nothing to restrain the load against descent. It was of course customary to provide an electromagnetically actuated brake that held the drive motor shaft against rotation at any time that the motor was not energized, but failure of the helical threads effectively uncoupled the cable drum from the motor shaft so that the electromagnetic brake had no control over cable drum rotation.

SUMMARY OF THE INVENTION

The general object of the present invention is to provide a load brake for hoisting apparatus and similar load biased mechanism which has none of the above discussed disadvantages of the Weston load brake and which is nevertheless very compact, sturdy and reliable although capable of being produced at a cost no greater than that of an equivalent Weston device.

A more specific object of the invention is to provide a load brake that has no pawl-and-ratchet or one-way-clutch mechanism but which nevertheless affords very positive and dependable load control of the same type that a Weston device is intended to provide.

It is also a specific object of the invention to provide a load brake for apparatus having a cable drum or similar rotatable load actuating device that is biased in one direction of its rotation by a load connected with it and having a reversible drive motor by which the load actuating device is driven selectably in either direction of its rotation, whereby rotation of the actuating device is prevented when the motor is stopped, but whereby the actuating device is otherwise constrained to rotate in a direction and at a rate that correspond to the direction and rate of motor rotation, said load brake further providing for a positive and slipless connection between the motor and the load actuating device during rotation of the latter in the direction opposite to that in which it is biased by the load.

Another specific object of the invention is to provide a hoisting machine load brake which has no tendency to lock up and resist lowering after an upward acceleration of a heavy load, and which therefore is only restricted as to its load lifting capacity by the starting torque rating of its motor.

A further specific object of this invention is to provide a load brake device for a hoisting machine or the like that tends to fail safe in that any structural failure which might disengage the braking surfaces of the load brake device would still leave the load connected with the shaft of the hoisting machine drive motor and hence subject to control by the electromagnetic brake customarily associated with that motor shaft.

In general, the objects of the present invention are achieved with a load brake which is connected between a driver that is rotatable in opposite directions about an axis and a load actuating device that can rotate in said directions but tends to be rotated in one of said directions by a load connected therewith. The load brake provides a coupling between the driver and the device whereby the direction and rate of rotation of the device are constrained to correspond to the prevailing direction and rate of driver rotation, and whereby rotation of said device in said one direction is frictionally retarded to such an extent that the driver must apply torque to the device to cause it to rotate in that direction. The load brake is of the general type that comprises a first rotatable braking member which can rotate about an axis in both of said directions but which is connected with the load actuating device and therefore tends to be rotated in said one direction, a second rotatable braking member coaxial with the first rotatable braking member and constrained to rotate with the driver in the opposite direction of rotation, a friction member axially interposed between the first and the second rotatable braking members and having axially opposite surfaces arranged to be engaged by the first and second braking members for frictionally opposing their rotation, and motion translating means connected between said first and second rotatable braking members whereby rotation of the first rotatable braking member relative to the second rotatable braking member in said one direction of rotation causes axial convergence of the braking members towards clamping engagement with the friction member and opposite relative rotation between the braking members permits axial divergence of the braking members. The load brake of this invention is characterized by: said friction member being confined against rotation in both of said directions; and said driver having a lost motion connection with said first rotatable braking member whereby the driver imposes substantial torque upon said first rotatable braking member only when said driver is rotating in said opposite direction, so that the driver and the second rotatable braking member can have limited rotation in said one direction relative to the first rotatable braking member.

In a preferred embodiment of the invention the motion translating means connected between the first and second rotatable braking members comprises a plurality of elongated link elements, each having at one of its ends a swiveling connection to said first rotatable braking member and at its other end a swiveling connection to said second rotatable braking member, the swiveling connections of said link elements to each of those braking members being spaced substantially uniformly from said axis and from one another, and each link element having its connection with the first rotatable braking member circumferentially offset from its connection with the second rotatable braking member so that the link element extends at an inclination to said axis, the direction of said offset being such that rotation of the first rotatable braking member in said one direction relative to the second rotatable braking member so changes said inclination as to effect axial convergence between the braking members.

BRIEF DESCRIPTION OF THE DRAWINGS

In the accompanying drawings, which illustrate what is now regarded as a preferred embodiment of the invention.

DETAILED DESCRIPTION OF PREFERRED EMBODIMENTS

Figure 1:
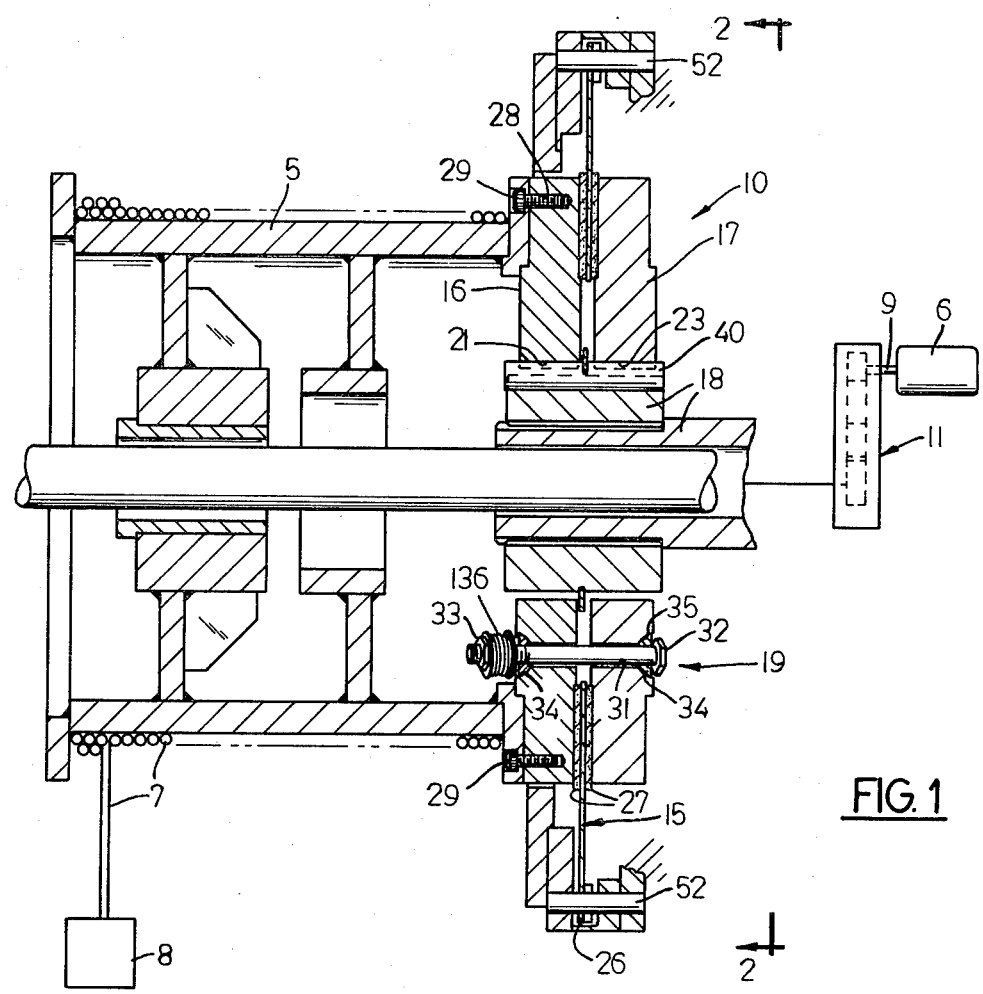
FIG. 1 is a more or less diagrammatic view of a load brake embodying the principles of this invention.
Figure 2:
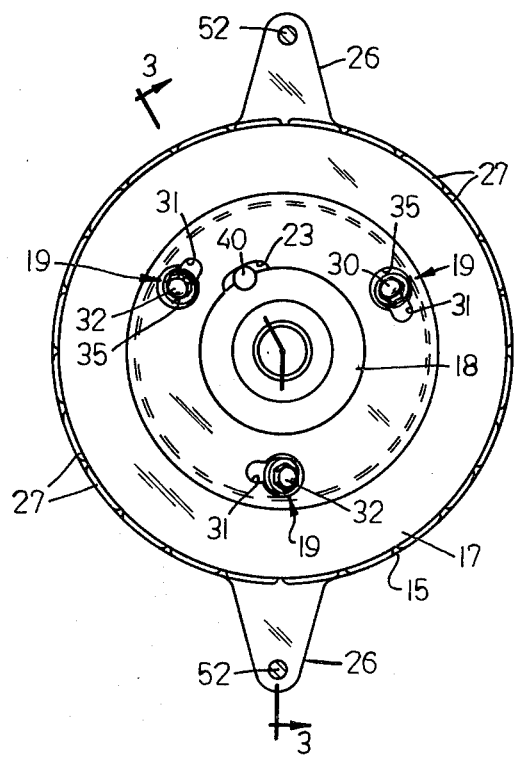
FIG. 2 is an end view of the load brake mechanism as seen from the right side of FIG. 1.

In the accompanying drawings the numeral 5 designates the cable drum of a hoisting machine, driven for rotation in opposite directions by means of a motor 6 which is here illustrated as a reversible electric motor. When the motor 6 runs in a lifting direction, it rotates the drum 5 in a direction to cause a cable 7 to be wound onto it, thus raising a load 8 attached to the free end of the cable. The cable drum 5 thus constitutes a load actuating device which is rotatable in opposite directions and which tends to be biased in one of those directions by its load.

As is customary, the motor 6 is equipped with a normally engaged electromagnetic brake (not shown) which is so connected in the motor energizing circuit that it is released when the motor is energized but is biased into braking engagement with the motor shaft 9 upon cut-off of the motor current supply. The motor brake can restrain a load against descent, and an a.c. motor tends to limit descent to a maximum rate, but the motor 6 and its brake cannot in themselves provide for precise load lowering because they permit so-called drift, that is, deceleration of the descending load at a relatively slow rate that varies with different loads. Therefore an additional braking mechanism is required for stopping the load promptly when lowering is to be terminated and for assuredly holding the load against descent when the motor 6 is at rest. To provide for such load control, a load brake 10 of this invention is connected between the motor 6 and the cable drum 5.

Ordinarily a reduction gear train 11 is connected between the motor 6 and the cable drum 5. As mentioned above, prior load brakes were usually connected between the motor shaft and the gear train, but the load brake 10 of the present invention need not incorporate a threaded power shaft and is inherently well adapted to be interposed between the reduction gear train 11 and the cable drum 5, although it could equally well be connected between the motor shaft 9 and the gear train if desired. A further advantage of connecting the load brake directly with the cable drum 5 is that the load brake can continue to act upon the load even in the event of a failure of the gear train 11 that would otherwise permit uncontrolled descent of the load. Lubrication problems are obviously minimized with the load brake components rotating at low speed.

The load brake 10 of this invention comprises an annular non-rotatable brake member 15 that comprises a friction member, and annular first and second rotatable brake members 16 and 17, respectively, that are located at axially opposite sides of the non-rotatable brake member 15. The three brake members 15, 16, 17 are concentric to a shaft 18 that comprises a driver which is coupled to the shaft 9 of the motor 6 through the gear train 11. Each of the rotatable brake members 16 and 17 has a lost motion connection with the driver 18, as explained hereinafter, whereby each rotatable brake member is directly driven by the driver for rotation in one direction but is free for limited rotation relative to the driver when the other rotatable brake member is being directly driven. The two rotatable brake members can therefore rotate relative to one another to a limited extent.

Connected between the rotatable brake members 16 and 17 is a motion translating means 19 whereby relative rotation between them in one direction axially converges them into clampwise frictional engagement with the non-rotatable brake member 15 and relative rotation between them in the opposite direction permits them to move axially away from one another.

The first rotatable brake member 16 is coupled to the cable drum 5 to be constrained to rotate in unison with it, so that the drum can be frictionally braked by clampwise engagement of the rotatable brake members 16 and 17 against the non-rotatable brake member 15.

As will appear more clearly from the detailed description that follows, the lost motion connection between the driver 18 and the first rotatable brake member 16 comprises cooperating abutments 40 and 21 on the driver and said brake member 16, respectively, which are so arranged that said first rotatable brake member 16 is directly driven from the driver only in the load-raising direction of rotation. The lost motion connection between the driver 18 and the second rotatable brake member 17 comprises cooperating abutments 40, 23 whereby the second rotatable brake member is directly driven by the driver in the load-lowering direction of rotation. As the description proceeds, it will be seen that the cooperation of the second rotatable brake member 17 with other components of the load brake is such that the second rotatable brake member comprises a control member, whereas the first rotatable brake member 16, in being constrained to rotate with the cable drum 5, can be regarded as a controlled member.

Figure 3:
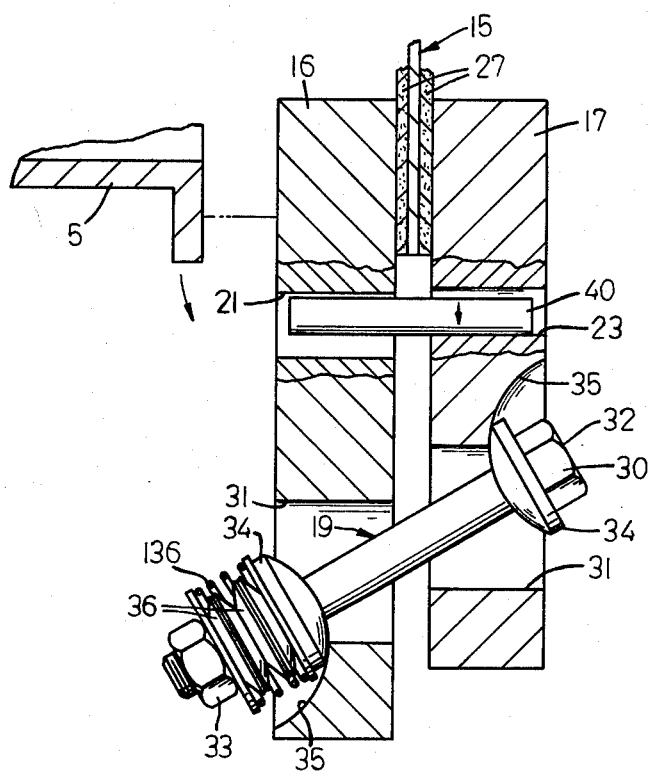
FIG. 3 is a fragmentary sectional view taken on the plane of the line 3—3 in FIG. 2, illustrating conditions that exist during lowering of a load.

When the driver 18 begins to rotate in the load-lowering direction, as shown in FIG. 3, the second rotatable brake member 17 is directly driven by the driver, whereas the first rotatable brake member 16 is uncoupled from the driver and no motor torque is imposed upon it. Hence the second rotatable brake member 17 tends to be rotated relative to the first rotatable brake member 16 in the direction that causes the motion translating means 19 to permit axial separation of the rotatable brake members. At the same time, however, load torque continues to be imposed upon the first rotatable brake member 16 and tends to produce relative rotation between the rotatable brake members 16 and 17 in the direction to maintain them clampingly engaged with the non-rotatable brake member 15. Consequently friction is maintained between the movable brake members 16, 17 and the non-rotatable brake member 15, and the torque due to such friction opposes motor torque and load torque to control descent of the load. Hence, during load lowering, motor torque always tends to relieve clamping force and thus tends to reduce friction torque, while load torque always tends to increase clamping force and thus tends to increase friction torque.

When the driver 18 stops rotating, there is no longer a force that tends to relieve friction torque, but the load still tends to maintain friction. This is to say that load torque tends to rotate the first rotatable brake member 16 relative to the second rotatable brake member 17 in the direction to converge those brake members, and therefore friction between the non-rotatable brake member 15 and the rotatable brake members 16, 17 securely brakes the load against descent, inasmuch as the convergent force is in substantially direct ratio to the load force.

Figure 4:
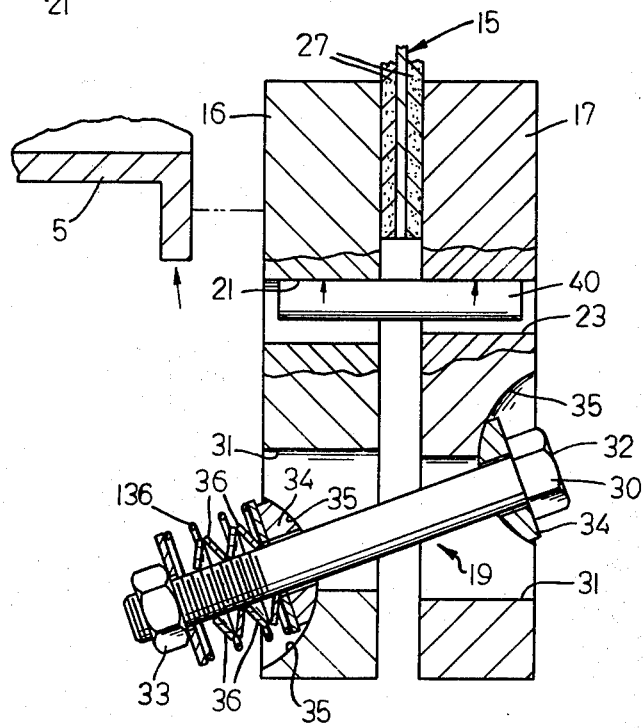
FIG. 4 is a view similar to FIG. 3 but showing conditions during load raising.
Figure 6:
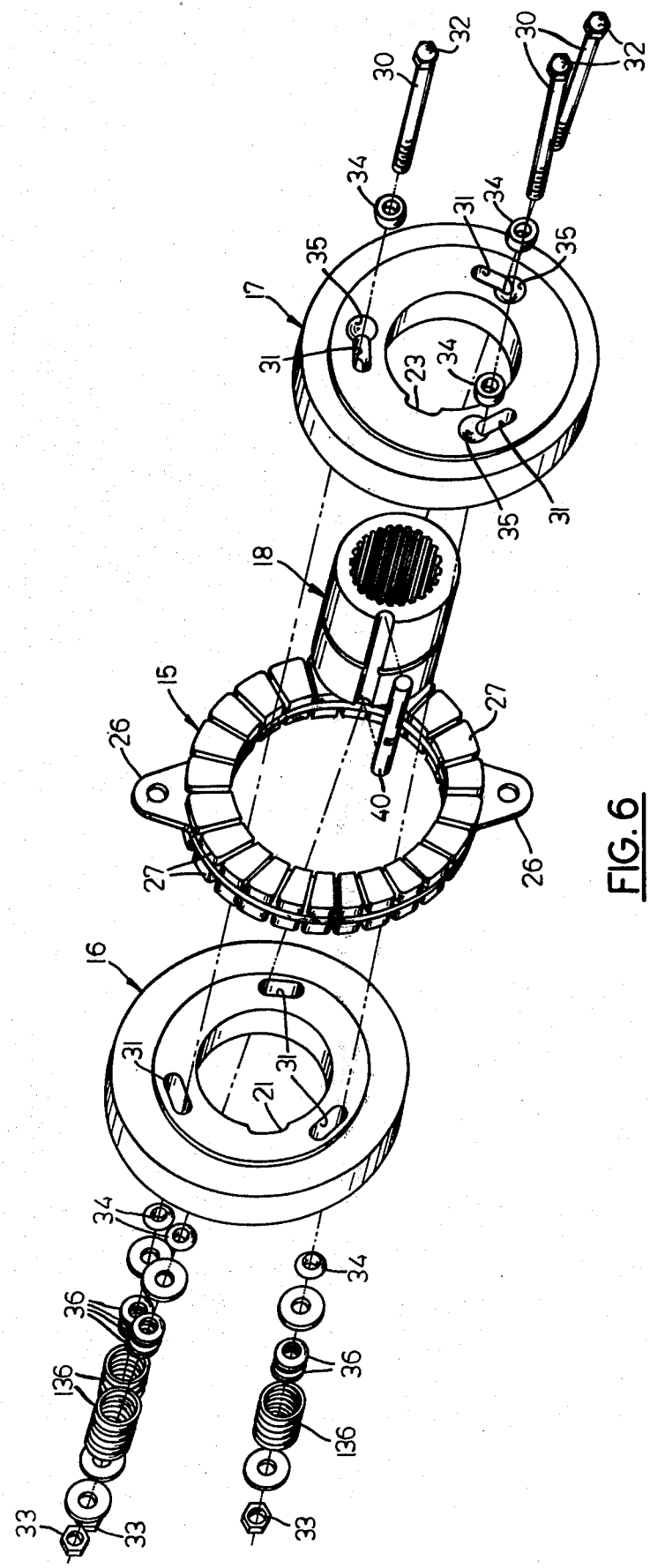
FIG. 6 is a disassembled perspective view of the load brake.

When the first rotatable brake member 16 is driven by the driver 18 for rotation in the load-raising direction, as shown in FIG. 4, the driver preferably also drives the second rotatable brake member 17 for rotation in that direction; but because of the lost motion connection between the driver and the first rotatable brake memer, the rotatable brake members 16 and 17 are in such positions of rotation relative to one another that their clamping engagement with the non-rotatable brake member 15 is almost completely relieved. However, to insure prompt braking action when the driver 18 stops, the two rotatable brake members 16 and 17 are maintained lightly engaged with the non-rotatable brake member 15 under the bias of springs 136, as explained hereinafter, so that they have a slight frictional drag against the non-rotatable brake member. Such drag can be of the same order of magnitude as that due to the conventional friction-actuated pawl lifting assembly in a Weston-type load brake. Normally at the termination of a lift the motor brake supports the suspended load, especially if it is a light one, but the load brake is available to hold the load if it is heavy or if the motor brake fails or slips; and by maintaining the control member 17 lightly engaged with the non-rotatable brake member 15 during load raising, the springs 136 ensure that there can be the necessary clamping relative rotation between the rotatable brake members 16, 17 to enable the load brake to prevent load descent.

Under certain conditions the springs 136 can be eliminated, and the control member 17 can be permitted to move out of contact with the non-rotatable brake member 15 during load raising, provided that when the driver 18 stops rotating, rotational inertia of the control member 17 will be sufficient to effect a prompt reconvergence of the rotatable brake members 16, 17 with the non-rotatable one, so that the load will be reliably braked against descent.

It will be observed that when the driver 18 begins to rotate in the load raising direction, all of its torque is imposed directly upon the first rotatable brake member 16 to drive it in a direction that tends to release clamping engagement of the rotatable brake members 16, 17 with the non-rotatable brake member 15. In effect, therefore, an upward acceleration of the load tends to release clamping force between the brake members, rather than increasing such force, as occurred with the Weston load brake; and therefore the load brake of the present invention has no tendency to lock up against lowering in consequence of lifting a heavy load.

Turning now to a more specific consideration of the structure of the load brake of the present invention, the annular non-rotatable brake member 15 has an outside diameter which is about equal to, or a little larger than, the outside diameter of each of the annular rotatable brake members 16, 17; but its inside diameter is substantially larger than that of either of the rotatable brake members so that the motion translating means 19 that is connected between the rotatable brake members 16, 17 can extend through the non-rotatable brake member 15 without interference. Apertured radially outwardly projecting ears 26 on the non-rotatable brake member 15 provide for its confinement against rotation, as by means of pins 52 that connect it to fixed structure of a hoisting machine.

The non-rotatable brake member 15 can comprise a relatively thin plate having flat surfaces that face in opposite axial directions and each of which is opposed by a flat surface on one of the rotatable brake members 16, 17. On at least one of its surfaces—preferably on both—the non-rotatable brake member has a friction means 27, here illustrated as brake pads. Obviously the friction means could be mounted on the opposing surfaces of the rotatable brake members 16, 17 instead of on the non-rotatable brake member 15. Preferably the friction means 27 has some axial resilience to avoid chatter during braking operation.

The first rotatable brake member 16 can have a ring of bolt holes 28 near its outer circumference to provide for its coaxial securement by means of bolts 29 to the cable drum 5 or other load actuating device. The bolts 29 can permit the first rotatable brake member to have some axial motion relative to the cable drum, or alternatively and preferably, as shown, the non-rotatable brake member 15 can be mounted on the pins 52 for limited axial motion, to enable the two rotatable brake members 16, 17 to exert equal axial forces against the non-rotatable brake member 15.

It will be evident that there could be two or more non-rotatable brake members, cooperating with a multiplicity of rotatable brake members connected in two sets corresponding to the individual rotatable brake members 16 and 17. However, the less complicated arrangement here described and illustrated has been found to be very satisfactory under widely varying conditions, and additional brake members would seem to be needed only in rare cases.

The motion translating means 19 comprises three elongated tension links 30, which are preferably rigid and each preferably in the form of a bolt having swivel connections at its opposite ends with the respective rotatable brake members 16, 17. To accommodate the tension links each rotatable brake member 16, 17 has three holes 31 therethrough that are near its inner circumference and are spaced apart at equal circumferential intervals, and each of the bolts 30 extends through one of these holes with a swiveling fit. Each of the tension link bolts 30 has a head 32 that overlies the outer surface of one rotatable brake member and has a nut 33 threaded onto its opposite end portion. To provide easily swiveling connections between each tension bolt 30 and the two rotatable brake members 16 and 17, the head 32 and the nut 33 on the bolt each overlie a dome-shaped washer 34 that has its spherical surface received in a mating spherical socket or countersink 35 in the adjacent rotatable brake member. A rather short, stiff compression spring 36 at one end of such tension bolt, confined, for example, between its head and the adjacent dome-shaped washer 34, has been found desirable to prevent chatter during load lowering. The stiffer spring 36 can be either a helical spring or (as shown) a stack of belleville washers. The spring 136 that maintains the rotatable brake members 16 and 17 in light contact with the non-rotatable brake member 15 during load raising is longer than the spring 36 and can surround the latter. The function of the soft spring 136 is such that it could be replaced by a torsion spring reacting directly between the rotatable brake members 16, 17. The short, stiff spring 36 is so arranged that it exerts no bias on the movable brake members 16, 17 during load raising.

The holes 31 in the rotatable brake members 16, 17 through which the tension links 30 extend are all at like distances from the load brake axis, but the tension links extend between those members obliquely to that axis, all being inclined in the same direction and at like angles to said axis. Specifically, the tension link holes 31 in the controlled member 16 are circumferentially offset in the load-biased direction of rotation from those in the control member 17. Upon relative rotation between the rotatable brake members 16, 17 in the direction to increase the inclination of the tension links 30 to the load brake axis, the distance between the rotatable brake members is foreshortened to converge them for clamping engagement with the fixed brake member 15, whereas relative rotation of the rotatable brake members 16, 17 in the opposite direction swings the tension links towards parallelism with the load brake axis and relieves such clamping engagement. As the tension links 30 increase their inclination to the load brake axis to effect convergence of the rotatable brake members 16, 17 they also take up clearance between the short springs 36 and the rotatable brake member adjacent to them, so that the biasing force of those springs is brought into the system to prevent chatter.

It will be seen that the motion translating means 19 that is here disclosed is in itself novel in a load brake mechanism; and while it performs essentially the same function as a helically threaded shaft connected between the rotatable brake members 16, 17, it provides for a more compact arrangement of the load brake as a whole, inasmuch as the driver shaft 18 can extend coaxially through the three brake members 15, 16, 17 without interfering with the motion translating means 19, which has its tension links 30 extending through the central hole in the non-rotatable brake member 15 in radially spaced surrounding relation to the shaft 18. The motion translating means 19 has the further and very important advantage of being less expensive than a threaded shaft, especially for a large load brake structure. One further advantage is worth noting. Whereas a shaft with a power thread can fail catastrophically and without warning, with the present motion translating means 19, if one tension link 30 should break, the rest would undoubtedly survive and cooperate with the motor brake in restraining a load against lowering, and the behavior of the machine would give a very perceptible indication of mechanical failure. Even if all tension links were to break simultaneously, the cable drum 5 would still have a connection with the motor shaft through the first rotatable brake member 16 and the driver 18 and would thus be amenable to the motor brake.

The tension links 30, in their cooperation with the rotatable brake members 16, 17, can be analogized to a partial-turn helically threaded connection between those brake members. The axial relative displacement imparted to the rotatable brake members by reason of a given rotational displacement between them is the same as would be imparted to them by a helical thread connection having a pitch angle complementary to the angle of inclination of the tension links. On that basis, the forces acting in the load brake to hold a load against descent are given by:

$$T_{LD} = F_N \mu_L r_L + F_N r_H [\tan \alpha + f(\mu_H)].$$

where:
- $T_{LD}$ = torque of load;
- $F_N$ = force normal to the brake member friction surfaces;
- $\mu_L$ = coefficient of friction of the brake members;
- $r_L$ = mean radius of the brake element friction surfaces;
- $\alpha$ = angle of inclination of tension links to load brake axis;
- $r_H$ = mean radius of the tension link circle;
- $f(\mu_H)$ = function of coefficient of friction of tension links with rotatable brake members.

For proper operation of a load brake embodying the invention, the following relationship must obtain:

$$r_L \mu_L \geq r_H [\tan \alpha + f(\mu_H)].$$

A satisfactory inclination of the tension links for given conditions can be calculated from the fact that the value represented by the left side of this relationship should be between 2 and 6 times that represented by the right side, preferred values being near the lower end of this range. If the value represented by the left side is equal to, or less than, that represented by the right side, the load brake system will not self-energize and the load will be able to accelerate down. If the value of the left side is more than about six times that of the right side, the load brake will lock-up against lowering. However, the condition for such lock-up is not likely to be encountered in commonsense design because it would require the tension links 30 to extend so nearly in parallelism with the load brake axis that they would obviously be subjected to unduly high tension forces during braking. With practical machine design it would be difficult to get the tension links 30 at such a large angle to the axis that self-energizing could not take place.

It is significant that in the application of the second of the two above formulas, consideration need only be given to conditions at standstill of a lifted load, because braking force is then at its maximum value and is of course equal to the torque force exerted by the load. During load raising, braking force (which is then merely the slight drag exerted by the second rotatable brake member) is always substantially less than the available motor torque, which of course exceeds the opposing torque exerted by the maximum rated load. Hence, tension on the tension links—and therefore tension link friction—is at its maximum in the standstill condition and is reduced as soon as the driver 18 applies either load-lowering torque or load-raising torque. This is in contrast to the conventional Weston load brake, which must be designed not only with regard for the standstill load braking condition but also with regard to a brake force equal to the torque force needed to give the maximum rated load its maximum attainable upward acceleration.

As is known in the art, the helix angle $\alpha$ between the tension link axes and the load brake axis should be smaller during lowering of a light load than during lowering of a heavy one. The stiff springs 36 provide for such change in helix angle with load. It will be apparent that without those springs the tension links would be at nearly the same angle $\alpha$ to the load brake axis during lowering of a light load as during lowering of a heavy one. Thus with proper selection of the springs 36 the load brake can be tailored to predetermine the low limit of the range of values for which self-energizing braking action of the load brake is reliable. That low limit can readily be established at a value at which the motor brake affords adequate control.

The lost motion connection between the driver 18 and each of the rotatable brake members 16 and 17 can take any of a variety of forms. In each case it provides for the driver shaft 18 to rotate through a small fraction of a turn relative to both of those brake members 16, 17, between driving engagement with the first rotatable brake member 16 to rotate the same in the load lifting direction and driving engagement with the second rotatable brake member 17 to rotate it in the load lowering direction. Preferably it also provides a connection between the driver 18 and the second rotatable brake member 17 during load raising, to prevent excessive axial divergence of the rotatable brake members.

Figure 5:
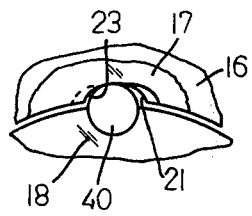
FIG. 5 is a fragmentary view in cross section showing a preferred form of lost motion connection between the driver and each of the first and second rotatable brake members.

FIG. 5 illustrates a preferred form of lost motion connection wherein an abutment on the driver 18 is defined by a cylindrical pin 40 that is received with a close fit in an axially extending groove in the driver, which groove is of semi-circular cross-section. The pin 40 is confined in that groove and is held against radial and axial displacement relative to the driver 18 by means of a spring clip 41 which encircles the pin and the driver and which is received in a relatively deep but narrow transverse slot 42 in the pin and in an aligned circumferential groove in the driver.

To cooperate with the pin 40 in providing the lost motion connection, each of the rotatable brake members 16, 17 has an arcuate cut-out or bay 44 in its inner circumference in which the pin 40 is received and which is of such circumferential extent as to permit the required amount of relative rotation between the driver 18 and the rotatable brake member. The end portions of the cut-outs 44 are curved on a radius such that the pin 40 drivingly engages the rotatable brake member at an abutment 21, 23 which is spaced a little distance from the corner defined by the junction of the cut-out 44 with the inner circumference of the rotatable brake member. With the pin 40 engaging the rotatable brake member 16 or 17 as just described, the pin 40 is able to transmit high torque forces to the brake member without danger of breaking off the corner just mentioned and with assurance that the reaction forces upon the pin 40 will merely seat it firmly in its groove in the driver 18.

From the foregoing description taken with the accompanying drawings it will be seen that the load brake of the present invention can be produced at no more cost than an equivalent capacity load brake of the conventional Weston type but possesses several advantages over the Weston brake, particularly including the capability to be unlocked for load lowering by means of a torque force that does not exceed the brake force needed for supporting the load at a standstill.

I claim:

1. A load brake for connection between a driver that is rotatable in opposite directions and a load actuating device that can rotate in opposite directions but tends to be rotated in one direction by a load connected therewith, said load brake providing a coupling between said driver and said device whereby the direction and rate of rotation of said device are constrained to correspond to the prevailing direction and rate of driver rotation, and whereby rotation of said device in said one direction is frictionally retarded to such an extent that the driver must apply torque to the device to effect its rotation in that direction, said load brake comprising:
   A. an annular non-rotatable brake member having surfaces that face in opposite substantially axial directions;
   B. annular first and second rotatable brake members substantially concentric to said non-rotatable brake member at axially opposite sides thereof, said rotatable brake members being confined to rotation and to limited axial motion relative to one another towards and from clamping engagement with the non-rotatable brake member,
      (1) said first rotatable brake member being connectable in rotation transmitting relationship to said device, and
      (2) each of said rotatable brake members having a surface that opposes one of said surfaces on the non-rotatable brake member;
   C. friction means on one of the opposing surfaces of the non-rotatable brake member and a rotatable brake member for frictionally inhibiting rotation of that rotatable brake member;
   D. rotation translating means connected between the rotatable brake members whereby rotation of said first rotatable brake member in said one direction of rotation relative to the second rotatable brake member causes axial convergence of said rotatable brake members into clamping engagement with the non-rotatable brake member but rotation of the first rotatable brake member in the opposite direction relative to the second rotatable brake member permits axial divergence of the rotatable brake members; and
   E. cooperating means on said driver and on each of said rotatable brake members providing a lost motion rotation transmitting connection between the driver and the rotatable brake member whereby the driver imposes substantial driving torque only upon the second rotatable brake member during its rotation in said one direction and only upon the first rotatable brake member during its rotation in said opposite direction.

2. The load brake of claim 1, further characterized by said rotation translating means comprising:
   a plurality of elongated links extending through the central hole in the annular non-rotatable brake member,
   (1) each of said links having at one of its ends a swiveling connection with said first rotatable brake member and at its other end a swiveling connection with the second rotatable brake member, and
   (2) each of said links having its connection with the first rotatable brake member offset in said one direction of rotation from its connection with the second rotatable brake member so that all of said links are lengthwise inclined to the axis of said shaft.

3. The load brake of claim 1, further characterized by: said lost motion connection between the driver and the second rotatable brake member being further arranged to apply a small driving torque to said second rotatable brake member during rotation of the driver in said opposite direction, to thus maintain both of the rotatable brake members in light engagement with the non-rotatable brake member.

4. The load brake of claim 1, further characterized by: spring means reacting between the rotatable brake members to urge them axially towards one another.

5. The load brake of claim 2 wherein each of said links is rigid, extends through each of the rotatable brake members, and has an abutment on each of its end portions that opposes the adjacent rotatable brake member to maintain the connection between the link and the brake member, further characterized by:
   a coiled spring surrounding each link between one of said abutments thereon and the adjacent rotatable brake member and reacting between that abutment and that rotatable brake member to urge the rotatable brake members axially towards one another.

6. A load brake for load actuating apparatus comprising a driver rotatable in opposite directions and a coaxial driven member that is rotatable in both of said directions but tends to be rotated in one of said directions by a load connected therewith, said load brake preventing the driven member from rotating when the driver is not rotating and otherwise constraining the driven member to rotate at the rate and in the direction of driver rotation, said load brake comprising:
  A. first and second brake members rotatable concentrically to the driver and the driven member, each having a substantially flat surface which faces axially towards the other brake member,
    (1) said first brake member being constrained to rotate with said driven member and
    (2) one of said brake members being axially displaceable relative to the other;
  B. a friction member axially interposed between said first and second brake members and confined against rotation in said one direction, said friction member having opposite substantially flat surfaces, each of which opposes said flat surface on one of the brake members;
  C. friction means on one of said opposing surfaces of the friction member and one of said brake members whereby rotation of said one brake member is frictionally opposed in consequence of engagement of those surfaces;
  D. rotation translating means connected between said brake members and arranged to effect relative axial convergence of the brake members towards clampwise engagement with the friction member in consequence of rotation in said one direction of said first brake member relative to said second brake member but to permit axial relative divergence of the brake members upon rotation of the first brake member in the opposite direction relative to the second brake member; and
  E. cooperating rotation transmitting means on said driver and on each of said brake members, arranged to transmit rotation to each brake member in the direction in which rotation of that brake member relative to the other one provides for divergence of the brake members, while leaving the other brake member free for relative rotation in the direction that brings about convergence of the brake members.

7. A load brake of the type comprising a driver rotatable in opposite directions about an axis, a rotatable braking member which can rotate about said axis in said directions but tends to be biased in one of said directions by a load connected therewith and which has a substantially axially facing surface, a cooperating braking element which is confined against rotation in said one direction and which has a substantially axially facing surface that is engageable by said surface on the rotatable braking member to frictionally oppose rotation of the rotatable braking member in said one direction, and a control member rotatable in said directions coaxially with said rotatable braking member and which is constrained to rotate in said one direction with the driver, and wherein said rotatable braking member, said control member and said cooperating braking element are arranged for axial movement relative to one another to provide for variation of the axial force under which said surfaces are engaged, said load brake being characterized by:
  A. said braking element
    (1) being also confined against rotation in the opposite direction and
    (2) having another substantially axially facing surface which is opposite its first memtioned surface and which is engageable by the control member;
  B. said braking member and said control member being at axially opposite sides of said braking element; and
  C. a plurality of elongated link elements, each having at one of its ends a swiveling connection to said rotatable braking member and at its other end a swiveling connection to said control member, each link element having its connection with the rotatable braking member circumferentially offset from its connection with the control member so that the link element extends at an inclination to said axis, the direction of said offset being such that rotation of the rotatable braking member in said one direction relative to the control member so changes said inclination as to effect relative axial shifting between said members in the direction to engage them clampwise with said braking element.

8. The load brake of claim 7, further characterized by:
  (1) said cooperating braking element
    (a) being annular and substantially concentric to said axis, and
    (b) having its axially opposite substantially flat; and
  (2) said control member having a substantially flat surface which is opposingly engageable with the other of said substantially flat surfaces on the cooperating braking element.

9. The load brake of claim 8 further characterized by:
  (3) a lost motion connection between said driver and each of said members whereby said driver applies substantial torque only to said control member when the driver rotates in said one direction and applies substantial torque only to said rotatable braking member when the driver rotates in said opposite direction.

10. The load brake of claim 9, wherein each of said members is annular and said driver comprises a shaft extending coaxially through them, and wherein said lost motion connection between the driver and each of said members comprises:
  (1) a cylindrical pin received in an axially extending groove in said driver that has a closely fitting substantially semi-circular cross-section; and
  (2) an abutment on each member, defined by a bay in the inside diameter of the member, which bay has near one end thereof a curving edge surface against which the cylindrical surface of said pin engages.

11. The load brake of claim 8 wherein each of said link elements is rigid.

12. A load brake of the type comprising a driver rotatable about an axis in opposite lowering and raising directions, a first rotatable braking member which can rotate about said axis in said directions but tends to be biased in said lowering direction by a load connected therewith, a second rotatable braking member coaxial with the first rotatable braking member and constrained to rotate with the driver in said lowering direction of rotation, a friction member axially interposed between said first and second rotatable braking members and having axially opposite surfaces arranged to be respectively engaged by said first and second rotatable braking members for frictionally opposing their rotation, and motion translating means connected between said first and second rotatable braking members whereby rotation of the first rotatable braking member relative to the second rotatable braking member in said lowering direction of rotation causes axial convergence of the braking members towards clamping engagement with the friction member and opposite relative rotation between the braking members permits axial divergence of the braking members, said load brake characterized by:

A. said friction member being confined against rotation in both of said directions of rotation;

B. said driver having a lost motion connection with said first rotatable braking member whereby the driver imposes substantial torque thereon only when the driver is rotating in said raising direction and whereby the driver can have limited rotation in said lowering direction relative to the first rotatable braking member; and C. said driver having a lost motion connection with said second rotatable braking member whereby the driver imposes substantial torque thereon only when said driver is rotating in the lowering direction and whereby the driver can have limited rotation in said raising direction relative to the second rotatable braking member.

13. A load brake having a driver rotatable in opposite raising and lowering directions, a controlled member constrained to coaxial rotation with said driver and which tends to be biased in said lowering direction, said controlled member having a lost motion connection with said driver whereby said controlled member is constrained to rotate with said driver in the raising direction but the driver can have limited rotation in the lowering direction relative to the controlled member, a coaxially rotatable control member having a lost motion connection with said driver whereby said control member is constrained to rotate with said driver in the lowering direction but the driver can have limited rotation in the raising direction relative to the control member, a fixed brake element with which said control member frictionally cooperates to be restrained against rotation in the lowering direction, and a plurality of links, each having opposite ends swivelably connected with said control member and with said controlled member, respectively, for translating relative rotation between those members in one direction into relative axial motion in one direction and by which relative rotation between said members is limited, said load brake being characterized by:

A. said fixed brake element
   (1) being coaxially interposed between said control member and said controlled member,
   (2) having axially opposite substantially flat surfaces, one of which is engageable by said control member and the other of which is engageable by said controlled member, and
   (3) being annular, with said links extending therethrough; and B. said links being arranged to effect relative convergent axial motion between said control member and said controlled member, to bring them into clamping engagement with said brake element, upon rotation of said controlled member in said lowering direction relative to the control member.

14. The load brake of claim 13, further characterized by:

C. each of said links extending through each of said members and having an abutment on each of its end portions that opposes the adjacent member to maintain the connection between the link and the member; and D. a spring surrounding each link and reacting between one of said abutments thereon and the adjacent member to urge said members axially towards one another.

* * * * *